(12) United States Patent
Salter et al.

(10) Patent No.: US 10,048,113 B2
(45) Date of Patent: *Aug. 14, 2018

(54) VEHICLE LOAD INDICATOR

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,066

(22) Filed: Feb. 21, 2018

(65) Prior Publication Data

US 2018/0195894 A1    Jul. 12, 2018

Related U.S. Application Data

(63) Continuation of application No. 15/404,520, filed on Jan. 12, 2017, now Pat. No. 9,933,294.

(51) Int. Cl.
| | |
|---|---|
| *G01G 19/10* | (2006.01) |
| *G01G 23/32* | (2006.01) |
| *G01G 19/08* | (2006.01) |
| *B60C 9/00* | (2006.01) |
| *B60C 5/00* | (2006.01) |
| *G01J 1/42* | (2006.01) |

(52) U.S. Cl.
CPC ............. *G01G 23/32* (2013.01); *B60C 5/005* (2013.01); *B60C 9/00* (2013.01); *G01G 19/08* (2013.01); *G01J 1/4204* (2013.01); *B60Y 2400/305* (2013.01); *B60Y 2400/306* (2013.01); *G01J 2001/4266* (2013.01)

(58) Field of Classification Search
None
See application file for complete search history.

(56) References Cited

U.S. PATENT DOCUMENTS

| | | | |
|---|---|---|---|
| 3,646,512 | A | 2/1972 | Borgstede |
| 4,108,262 | A | 8/1978 | Anderson |
| 4,921,578 | A | 5/1990 | Shiraishi et al. |
| 4,981,186 | A | 1/1991 | Shankle et al. |
| 8,981,918 | B2 | 3/2015 | Panse |
| 2001/0009206 | A1 | 7/2001 | Lines |
| 2003/0090384 | A1 | 5/2003 | Nishimura et al. |
| 2006/0125919 | A1 | 6/2006 | Camilleri et al. |
| 2009/0146846 | A1 | 6/2009 | Grossman |

(Continued)

FOREIGN PATENT DOCUMENTS

CN    203819111 U    9/2014

OTHER PUBLICATIONS

Kopier, Michelle, OEM Off-Highway, Ready, Set, Load!, "A behind the scenes look at Volvo's on-board weighing system set to launch at INTERMAT 2012 in Paris, France," Mar. 16, 2012 (6 pages).

*Primary Examiner* — Brent Swarthout
(74) *Attorney, Agent, or Firm* — Jason Rogers; Price Heneveld LLP

(57) ABSTRACT

A system for a vehicle comprises a load sensor configured to sense a load on the vehicle. The vehicle further includes a load indicator where the load indicator is disposed proximate the vehicle such that the load indicator generates an output in response to the load sensed by the load sensor.

20 Claims, 5 Drawing Sheets

(56) References Cited

U.S. PATENT DOCUMENTS

| | | |
|---|---|---|
| 2014/0054096 A1 | 2/2014 | Carruthers et al. |
| 2016/0052447 A1 | 2/2016 | Salter et al. |
| 2016/0121791 A1 | 5/2016 | Shimizu |
| 2016/0177521 A1 | 6/2016 | Laugwitz et al. |

VEHICLE LOAD INDICATOR

CROSS-REFERENCE TO RELATED APPLICATION

The present application is a continuation of U.S. patent application Ser. No. 15/404,520 (now U.S. Pat. No. 9,933,294), filed Jan. 12, 2017, entitled VEHICLE LOAD INDICATOR, the entire disclosure of which is hereby incorporated herein by reference.

FIELD OF THE INVENTION

The present invention generally relates to vehicle load indicating systems.

BACKGROUND OF THE INVENTION

Vehicles are often configured to carry a load and have load capacities. It is important for vehicle users to know when they are approaching and/or exceeding the load capacities of their vehicles. If vehicle load limits are surpassed, then steering, handling, and braking can be compromised. If a vehicle is overloaded, then there is an increased chance of the vehicle experiencing a mechanical failure, a tire rupture, or a roll event. It may be difficult for a user to estimate the weight of the vehicle contents as the user is in the process of loading the vehicle. Thus, it is desirable for the user to know the load being added to the vehicle.

Furthermore, it is paramount that a user be able to intuitively and easily understand the amount of load the user has loaded into the vehicle while the user is loading the vehicle. For example, it would be very beneficial to a fork lift operator to know how close a load is to maximum capacity while he or she is loading the vehicle with the fork lift.

SUMMARY OF THE INVENTION

According to one aspect of the present invention, a load indicator system for a vehicle comprises a load sensor configured to sense a load on the vehicle. The system further includes a load indicator. The load indicator is disposed proximate the vehicle such that the load indicator generates an output in response to the load sensed by the load sensor.

According to another aspect of the present invention, a load indicator system for a vehicle comprises one or more load indicators coupled to a vehicle. A load sensor is configured to sense a load on the vehicle. The load sensor is in communication with the one or more indicators. The one or more indicators are configured to generate an output based on the load sensed by the load sensor.

According to yet another aspect of the present invention, a method for indicating a vehicle load includes the steps of coupling a load-sensing device to the vehicle and sensing a load on the vehicle with the load-sensing device. A load indicator is selectively activated at a variable intensity as a function of the load sensed by the load-sensing device.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the disclosure will be set forth in the detailed description which follows and will be apparent to those skilled in the art from the description or recognized by practicing the disclosure as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or other between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
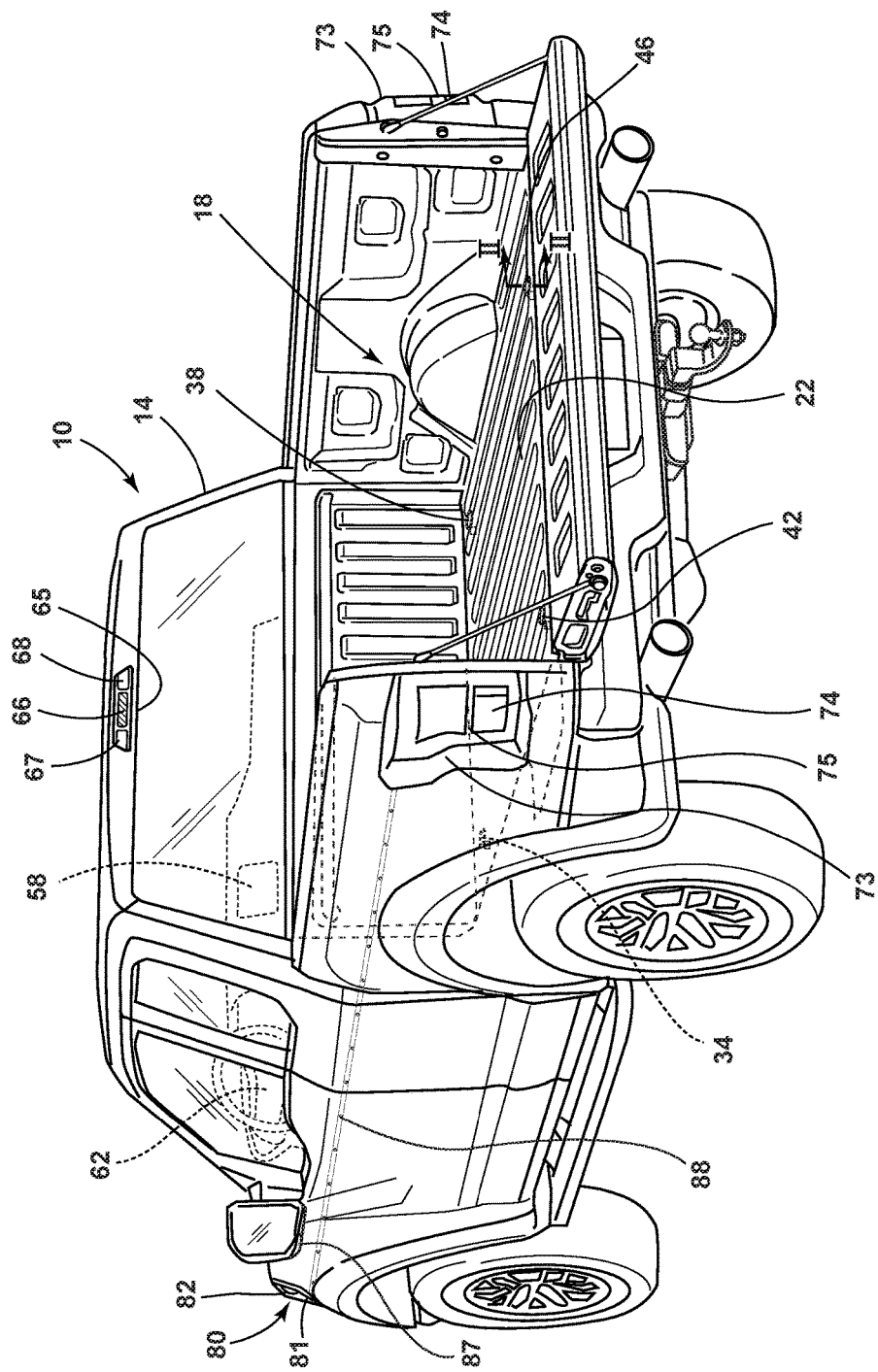
FIG. 1 is a rear perspective view of a vehicle equipped with a load indicator system, according to one embodiment.
Figure 2:
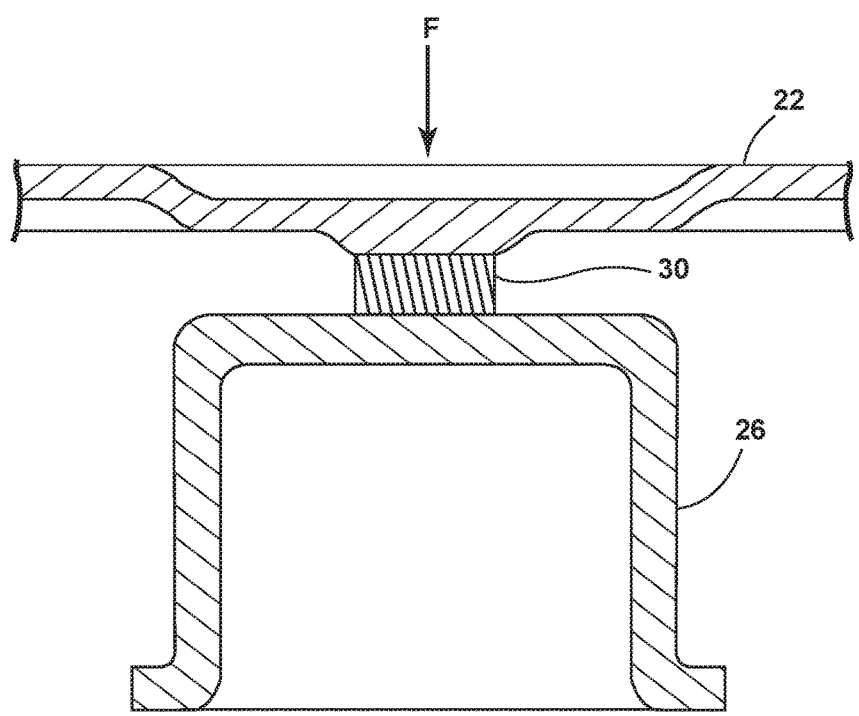
FIG. 2 is a cross-sectional view taken through line II-II of FIG. 1 illustrating a load sensor of the load indicator system, according to one embodiment.
Figure 3:
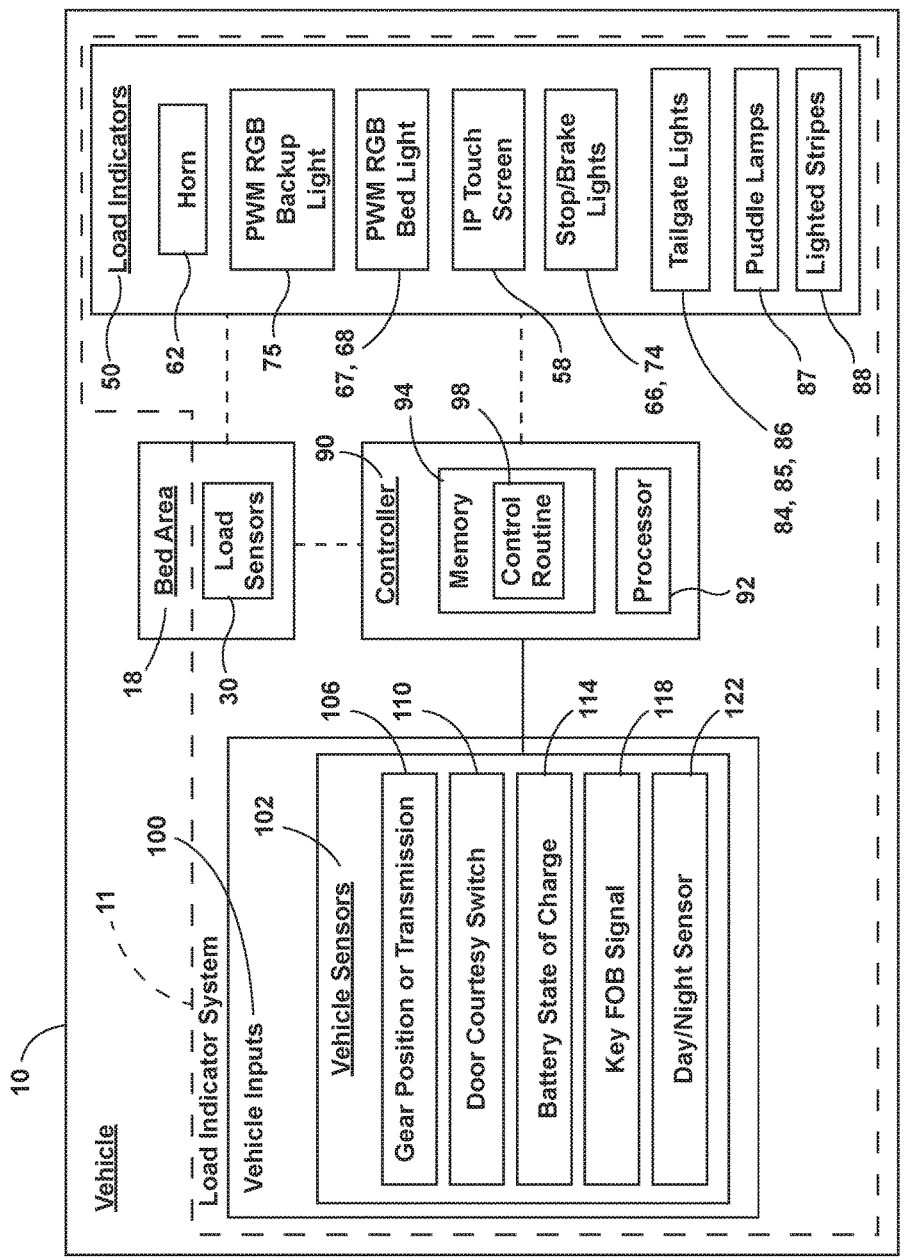
FIG. 3 is a schematic block diagram of the vehicle and the load indicator system, according to one embodiment.

Turning now to FIGS. 1-3, reference numeral 10 generally designates a vehicle capable of carrying a load and having a load indicator system 11. The vehicle 10 includes a load sensor 30 configured to sense a load on the vehicle 10. The load sensor 30 senses the load on the vehicle 10. The vehicle 10 further includes a load indicator 50 where the load indicator 50 is in communication with the load sensor 30. The load indicator 50 is configured to generate an output based on the load sensed by the load sensor 30. In the embodiment shown, the vehicle 10 is a pickup truck which includes a body 14 defining a bed area 18. A bed 22 is operably coupled to the frame 26 through a plurality of mounting features 34, 38, 42, 46. In the embodiment shown, a load sensor 30 is positioned on each of the mounting features 34, 38, 42, 46 and configured to sense a load on the bed 22 associated with cargo in the bed 22. The load is the weight of cargo loaded in the bed 22. It should be appreciated that other load sensing arrangements may be employed. It should further be appreciated that the load indicator system 11 may be used on other vehicles such as sedans, SUVs and others to sense and indicate load.

Various lights are located on the vehicle 10. In one embodiment, the CHMSL (Center High Mount Stop Light) 65 includes brake light 66 and lights 67 and 68, which perform courtesy light and load indicator functions. In one embodiment, light 67 may be a courtesy light and light 68 may be a load indicator. Alternatively, light 68 will be a courtesy light, and light 67 will be a load indicator.

Figure 1A:
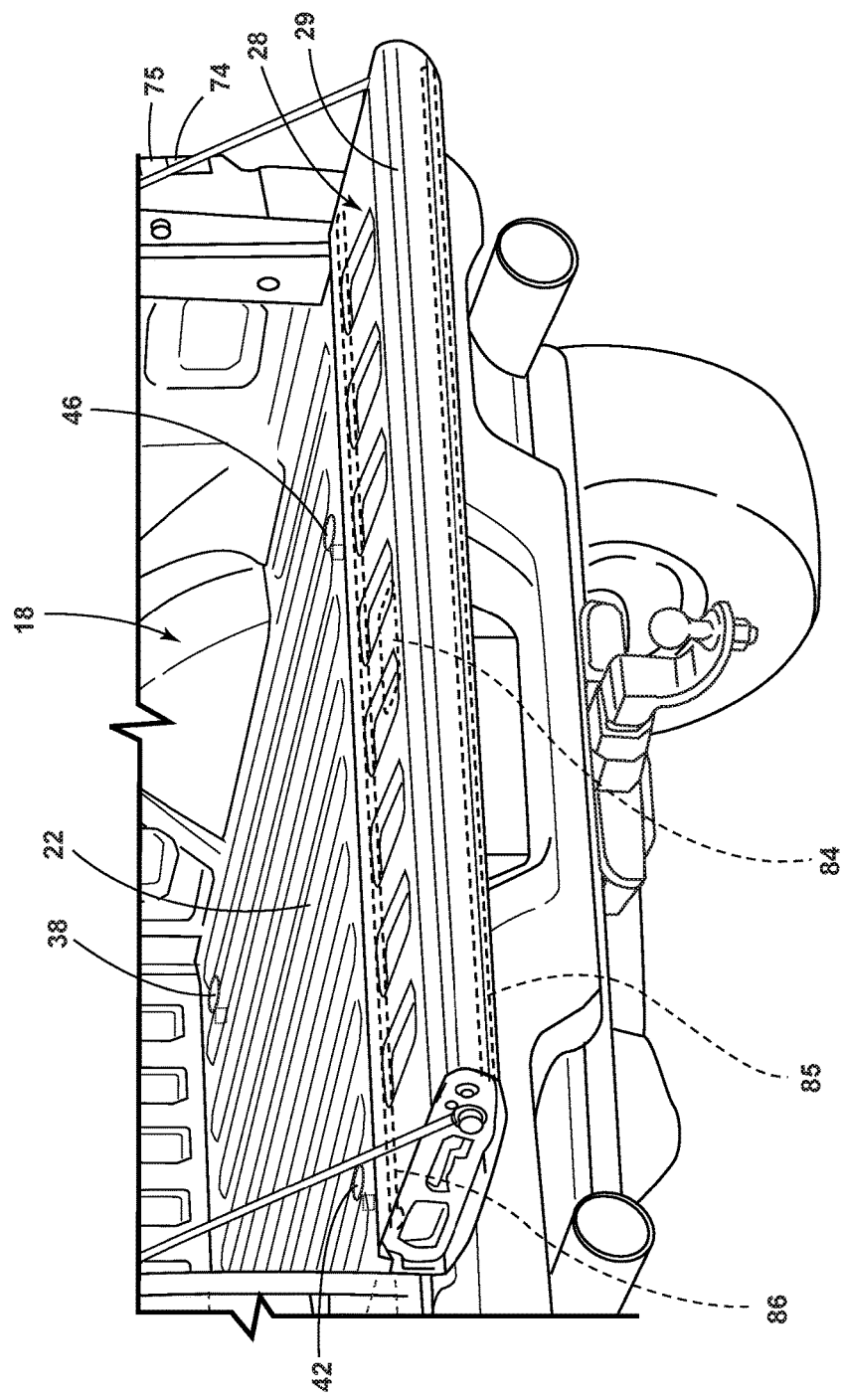
FIG. 1A is an enlarged view of the tailgate area of FIG. 1 illustrating the tailgate of a vehicle equipped with a load indicator system according to one embodiment.

The vehicle has taillights 73 and front lights 80. Each taillight 73 includes a stop/brake light 74 and back up light 75. The backup light 75 is sometimes referred to as the reverse light. Each front light 80 includes running lamps 81 and head lights 82. Puddle lamps 87 are also located on the vehicle 10. Lighted stripes 88 are located on the vehicle. Referring now to FIG. 1A, the tailgate area 28 has tailgate handle light 84, tailgate top light 85, and tailgate bottom light 86 on tailgate 29.

In one embodiment, a load sensor 30 is located on each of the mounting features 34, 38, 42, 46. According to other embodiments, only one or more than one sensor is/are used and in which the sensor(s) is (are) located in the bed area 18 or another area of the vehicle 10. The load sensor 30 may also be located proximate the vehicle 10.

The load indicator system 11 includes one or more load indicators 50 that can provide an output indicative of a load condition. Such load indicators 50 include: horn 62, backup light 75, brake light 66, bed light 67, bed light 68, stop/brake light 74, and miscellaneous exterior lamps including puddle lamps 87, lighted stripes 88, tailgate handle light 84, tailgate top light 85, and tailgate bottom light 86. The load indicators 50 may further include a display 58 such as an IP touch screen. The load indicators 50 may also include one or more electronic devices in communication with the load sensor. The electronic devices may include telephones or computers. The term "communication" as used herein refers to hardwired or wireless communication. For example, the bed load sensor 30 could be in wireless communication with a user's cell phone. The load indicator system 11 can include or make use of other systems in the vehicle.

The horn 62 may emit various audible sounds, including honking and chirping sounds.

Backup light 75 and bed lights 67, 68 may include RGB LEDS. An RGB LED is a red, green, blue light emitting diode light source that can mix together colors in various ways to produce a wide array of light colors. For example, an RGB LED could indicate the percentage of allowable weight in the bed area 18 by showing green color light for less than a 10% load, yellow color light for a 50% load, and red color light for a 100% allowable load. A PWM mixture refers to pulse width modulation, which is a modulation technique used to encode a message into a pulsing signal. The PWM feature may be incorporated in the RGB LEDs to generate different proportions of the red, green and blue colors. For the loading measurement function, backup light 75 and bed light 67, 68 could cycle from green for no (less than 10%) load and red for fully (100%) loaded with a PWM mixture in between to indicate the exact amount of load by color. In one embodiment, the two bed lights 67, 68 on the CHMSL 65 are configured to function as load indicators and/or courtesy lights. For example, while the user is loading the vehicle, light 67 may be configured to act as a load indicator while light 68 acts as a courtesy light. Alternatively, while the user is loading the vehicle, light 68 may be configured to act as a load indicator while light 67 acts as a courtesy light.

Referring now to FIG. 1, positioned within the vehicle 10 is display 58. The display 58 may be a touchscreen and/or be operated by mechanical inputs (e.g. keyboard, mouse, scroll, wheel, knob, etc.). The display 58 may be configured to depict an image or show data from the bed load sensor 30 or controller 90 to indicate the sensed load, as explained in greater detail below.

Referring now to FIG. 2, as explained above, in the one embodiment, each of the mounting features 34, 38, 42, 46 in bed area 18 include a load sensor 30. The load sensor 30 is a weight-based sensing system for determining a load in truck bed 22. When a load is placed in bed 22, it applies a downward force F, acting on the bed 22 and, in turn, bed frame 26. As the magnitude of the downward force increases, the weight on the bed 22 acting on the bed frame 26 increases. Bed frame 26 may contain one or more embedded weight sensors 30 which can determine the weight of bed 22 with its load therein. In instances where multiple weight sensors 30 are used, weight sensors 30 may be positioned so that the distribution of the load on the bed 22 can be determined. For example, weight sensor 30 in a rear right location near mounting feature 46 might sense a greater weight of bed 22 than weight sensor 30 in a front left location near mounting feature 34 of bed 22. Weight sensors 30 may be any known weight sensors, including load cells or pressure sensors in an air suspension. An electronic module may supply power to the weight sensor 30 and provide the associated buffer circuitry to transform a signal that is emitted from the weight sensor 30 into an operator indicator. One example of a weight sensor used in a pickup truck is disclosed in, U.S. Pat. No. 8,160,806 entitled Load-Sensing Systems for Light-Duty Trucks, which is hereby incorporated herein by reference. The weight sensor 30 may be in communication with a load indicator 50. Also, the weight sensor 30 may be in communication with the controller 90 which may communicate with the load indicator 50.

Referring now to FIG. 3, a block diagram of the vehicle 10 is shown including the load indicator system 11. As explained above, the bed area 18 includes one or more load sensors 30. Each load sensor 30 is in communication with controller 90. Load sensor 30 may emit an analog, digital, or bus signal to the controller 90. The controller 90 may include a processor 92 and a memory 94 for executing stored routines or for storing information (e.g., related to the operation of load sensor 30 and/or vehicle inputs 100). In the depicted embodiment, the memory 94 of the controller 90 includes a control routine 98. In various embodiments, the controller 90 is a standalone device that is not in communication with body control modules, electronic control modules, engine control modules and/or other features of the vehicle 10. In various embodiments, the controller 90 can be any type of control circuitry. For example, the controller 90 could be a switch on a wire. In the depicted embodiment, the controller 90 is in communication with one or more vehicle inputs 100 that may be used in conjunction with the controller 90 and may communicate with the controller 90 through a multiplex communication bus (e.g., Lin, Can, etc.). In one embodiment, the vehicle input 100 may include communications from one or more vehicle sensors 102. The vehicle sensors 102 may include a gear position or transmission sensor 106, a door courtesy switch 110, a battery state of charge sensor 114, a key fob signal 118, a day/night sensor 122, and/or any other sensor that may be disposed within or in communication with vehicle 10. The door courtesy switch 110 provides a door ajar indication. The day/night sensor detects the ambient light level near the vehicle 10.

The controller 90 may selectively activate one or more load indicators 50 in response to a vehicle input 100 and/or a sensed load input from load sensor 30. In the depicted embodiment, load indicators 50 include horn 62, PWM RGB backup light 75, PWM RGB bed light 67, PWM RGB bed light 68, IP touchscreen 58, stop/brake light 66, stop/brake light 74, tailgate handle light 84, tailgate top light 85, tailgate bottom light 86, puddle lamps 87, and lighted stripes 88.

In one example, controller 90 may receive an input that is the load sensed by the load sensor 30 and an input that is the ambient light level from the day/night sensor 122. The controller 90 selectively activates one or more load indicators 50 to generate an output in response to the load sensed and the ambient light level.

In another example, controller 90 may receive an input that is the load sensed by the load sensor 30 and an input that is the door ajar indication from the door courtesy switch 110. The controller 90 selectively activates one or more load indicators 50 to generate an output in response to the load sensed and the door ajar indication.

Figure 4:
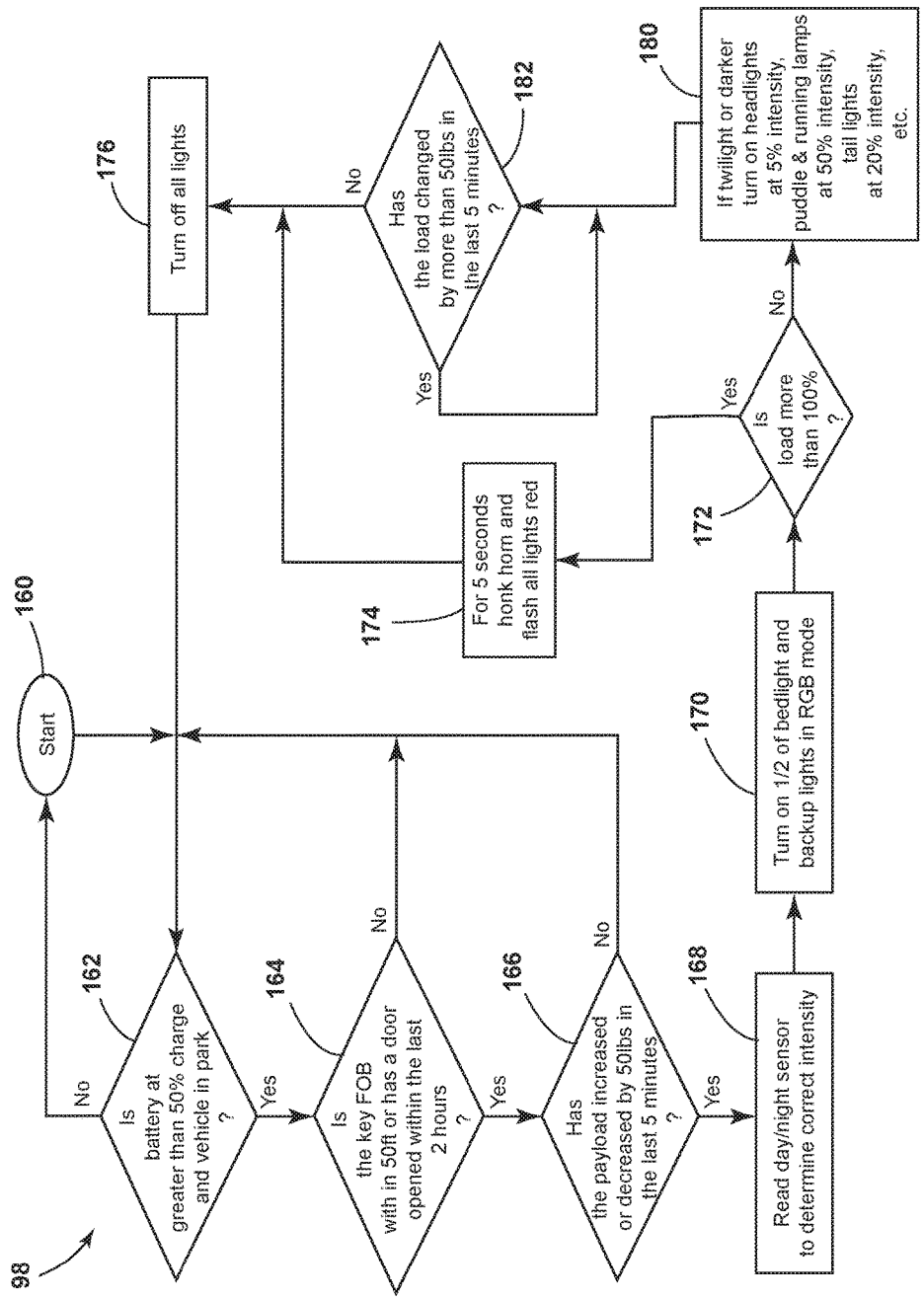
FIG. 4 is a flow chart of a control routine for indicating a vehicle load, according to one embodiment.

Referring to FIG. 4, an embodiment of the control routine 98 for sensing and indicating a load of a vehicle is depicted. In the depicted embodiment, the control routine 98 may begin at step 160 when the first steps are taken to determine the vehicle status. From step 160, the control routine 98 proceeds to decision step 162. At decision step 162, if the battery is at greater than 50% charge and the vehicle is in park, the routine 98 proceeds to decision step 164. Decision step 164 is where the determination is made of whether the key fob is within 50 feet of the vehicle or whether a vehicle door has opened in the last two hours. If the answer to one or both of the conditions in decision step 164 is affirmative, the routine 98 proceeds to decision step 166. The determination of step 164 indicates whether the owner is in the area. At decision step 166, the control routine 98 determines whether the payload has increased or decreased in weight by an incremental amount of 50 pounds in the last 5 minutes. If the answer to one or both questions is yes, then the next step 168 of control routine 98 is performed. The determination of step 166 indicates whether something is being loaded into or unloaded from or out of the vehicle bed or whether someone has climbed into or out of the vehicle bed. The next step 168 of reading the day/night sensor 122 to determine the correct intensity of indicator 50 lights is performed. Next step 170 directs that bed light 67 or 68 and backup light 75 are turned on in RGB mode. At step 170, in one embodiment, the bed light 67 or 68 and the backup light 75 can indicate the weight in the bed 22 by showing green for less than a 10% load, yellow for a 50% load, and red for a 100% load. Next a determination is made at decision step 172 as to whether the load is more than 100%. If the answer at step 172 is affirmative, then the next step 174 is that the horn 62 is activated to honk for 5 seconds while all lights flash red. In one embodiment, all lights that flash red comprise the CHMSL brake light 66, stop/brake light 74, CHMSL bed light 67, CHMSL bed light 68, and backup light 75. After that, all lights turn off at step 176. The control routine 98 returns to step 162. At decision step 172, if the load is not more than 100%, then if it is twilight or darker, indicative of a low or no light ambient condition, the head lights 82 are turned on at 5% intensity, puddle lamps 87 and running lamps 81 are turned on at 50% intensity, taillights 73 are turned on at 20% intensity. Also, other courtesy lights including lighted stripes 88, tailgate handle light 84, tailgate top light 85, and tailgate bottom light 86 may be turned on. Head lights 82, puddle lamps 87, running lamps 81, taillights 73, and other courtesy lights including lighted stripes 88, tailgate handle light 84, tailgate top light 85, and tailgate bottom light 86 are turned on to illuminate the area around the vehicle 10 for safe loading. Decision step 182 asks whether the load has changed by more than 50 pounds in the last 5 minutes. If the answer is affirmative, then the lights in step 180 remain on until the load has not changed by more than 50 pounds in the last 5 minutes. If the answer at 182 is negative, then all lights turn off at step 176. The determination at step 182 indicates whether loading has finished. The control routine 98 proceeds to its early state by returning to step 162.

A variety of advantages may be derived from the use of the present disclosure. A user is able to intuitively and easily understand the amount of load the user has loaded into the vehicle while the user is loading the vehicle. The vehicle load may be indicated through use of existing vehicle features (horn, lights, IP touch screen). The vehicle load may be indicated in a location on the vehicle that is visible to a user loading a vehicle. Courtesy lights responsive to ambient light levels may illuminate in combination with load indicators to aid loading.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector to other elements of the system may be varied, and the nature or numeral of adjustment positions provided between the element may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims as set forth below, are incorporated into and constitute part of this Detailed Description.

What is claimed is:

1. A load indicator system for a vehicle comprising:
   a load sensor disposed in a vehicle bed;
   at least one load indicator disposed outside of the vehicle; and
   a controller in communication with the load sensor and the at least one load indicator wherein the controller is configured to:
   receive a detection of an operator proximate the vehicle; and
   provide a load indication in response to a load sensed by the load sensor and the detection of the operator proximate the vehicle.

2. The load indicator system for a vehicle of claim 1, wherein the load indication comprises activation of a first load indicator at a first location.

3. The load indicator system for a vehicle of claim 2, wherein the load indication further comprises activation of a second load indicator at a second location.

4. The load indicator system for a vehicle of claim 2, wherein the first location comprises a location above a rear windshield.

5. The load indicator system for a vehicle of claim 3, wherein the second location comprises a location proximate a rear taillight.

6. The load indicator system for a vehicle of claim 4, wherein the location above the rear windshield comprises an elongated light configured to display a percentage of an allowable load.

7. The load indicator system for a vehicle of claim 5, wherein the location proximate the rear taillight comprises a backup light configured to display a percentage of allowable load.

8. The load indicator system for a vehicle of claim 3, wherein a vehicle bed separates the first location and the second location.

9. The load indicator system for a vehicle of claim 1, wherein the load sensed by the load sensor comprises a first load amount within a first predetermined load range or a second load amount within a second predetermined load range.

10. The load indicator system for a vehicle of claim 9, wherein the controller activates a first load indicator in response to a detection of the first load amount and wherein the controller activates a second load indicator in response to a detection of the second load amount.

11. The load indicator system for a vehicle of claim 10, wherein the controller activates the second load indicator in response to the detection of the first load amount.

12. A vehicle load indicator system comprising:
   a load sensor disposed beneath a vehicle bed;
   a load indicator outside a vehicle; and
   a controller in communication with the load sensor and the load indicator wherein the controller is configured to:
   receive a detection of an operator proximate the vehicle; and
   activate the load indicator to generate an output in response to a detection of a load condition and the detection of the operator proximate the vehicle.

13. The vehicle load indicator system of claim 12, wherein the load indicator comprises a first load indicator that displays a first output in response to a detection of a first load condition and a second load indicator that displays a second output in response to a detection of a second load condition.

14. The vehicle load indicator system of claim 13, wherein the first load condition comprises a detection of a first payload amount and the second load condition comprises a detection of a second payload amount.

15. The vehicle load indicator system of claim 14, wherein the first payload amount is less than the second payload amount.

16. The vehicle load indicator system of claim 15, wherein the first load indicator comprises an elongated light proximate a vehicle cabin and wherein the second load indicator comprises a light proximate a rear taillight.

17. The vehicle load indicator system of claim 16, wherein the elongated light proximate a vehicle cabin comprises a CHMSL.

18. A method for indicating a vehicle load comprising the steps of:
   detecting an operator within a proximity of a vehicle;
   detecting a first load condition;
   detecting a second load condition;
   comparing the first and second load conditions to a payload weight change history in response to the detection of the operator; and
   activating a load indicator to display the first and second load conditions.

19. The method for indicating a vehicle load of claim 18, wherein activating a load indicator to display the first and second load conditions further comprises the steps of:
   activating a first load indicator to display the first load condition; and
   activating a second load indicator to display the second load condition.

20. The method for indicating a vehicle load of claim 19, wherein detecting the first load condition further comprises the step of:
   detecting a first load within a first load range between a minimum load and an intermediate load; and
   wherein detecting the second load condition further comprises the step of:
   detecting a second load that comprises an intermediate load or a load within a second load range between the intermediate load and a maximum load.

* * * * *